June 23, 1953   D. H. GASTON   2,643,148
TRUNK LATCH TYPE FASTENER

Filed May 18, 1950   2 Sheets-Sheet 1

INVENTOR
Donald H. Gaston
BY
W. J. Eccleston
ATTORNEY

June 23, 1953    D. H. GASTON    2,643,148
TRUNK LATCH TYPE FASTENER
Filed May 18, 1950    2 Sheets-Sheet 2

INVENTOR
Donald H. Gaston
BY
W. J. Eccleston
ATTORNEY

Patented June 23, 1953

2,643,148

UNITED STATES PATENT OFFICE 2,643,148

TRUNK LATCH TYPE FASTENER

Donald H. Gaston, Los Angeles, Calif., assignor to the United States of America as represented by the Secretary of the Army Application May 18, 1950, Serial No. 162,628

6 Claims. (Cl. 292—249)

My invention relates to trunk latch type fasteners for releasably connecting two articles together. Such fasteners are well known and broadly comprise a lever plate and a loop pivoted on parallel axes for swinging movement to and from open and locked positions. As the lever plate is swung to the locked position, it causes the loop which has been previously engaged with a hook to draw a second article into engagement with the first article. The loop may be pivoted to the lever plate with the hook on the second article or the loop may be pivoted on the second article and the hook located on the lever plate. It is with the latter form of the fastener that this invention is concerned.

In both forms of these fasteners, the lever plate is normally secured in the locked position by being passed beyond a dead center during the final part of its closing movement so that the load on the loop tends to maintain the lever plate locked. As this necessitates the lever plate coming to rest in the locked position at a point below a plane common to the pivots of the lever plate and loop, this type of fastener is relatively bulky and cannot generally be used where the connected articles must present flush surfaces without recessing the parts of the fastener relatively deeply in the surfaces of the two articles. Therefore, where the distance the lever plate moves past the dead center to the locked position is reduced to a minimum, as where the connected articles are too thin to permit deep recesses, it has been found to be necessary to provide some sort of latch or lock to secure the lever plate in the locked position. Such means are known in the art.

To achieve the ultimate in flatness, it is desirable to form the lever plate of sheet material with the hook formed of an upstruck portion of the stock. However, unless the sheet material is extremely strong, the strain of the loop tends to distort the hook in the direction of the strain and even permit the escape of the loop from the hook.

With the foregoing in view, it is an object of my invention to provide an improved and relatively flat trunk latch type of fastener, together with novel latch means for locking the lever plate of the fastener in the locked position.

A further object is to provide such a fastener wherein the hook is carried by the lever plate and provides the detent which is engaged by the latch so that the latch not only locks the lever plate in the closed position but also closes the hook to retain the loop therein and simultaneously prevents distortion of the hook under the strain of the loop.

Other objects and advantages reside in the particular structure of the invention, the structure of the several elements forming the same, and in the combination and arrangement of such elements, all of which will be readily apparent to those skilled in the art upon reference to the attached drawing in connection with the following specification wherein the invention is shown, described and claimed.

Figure 1:
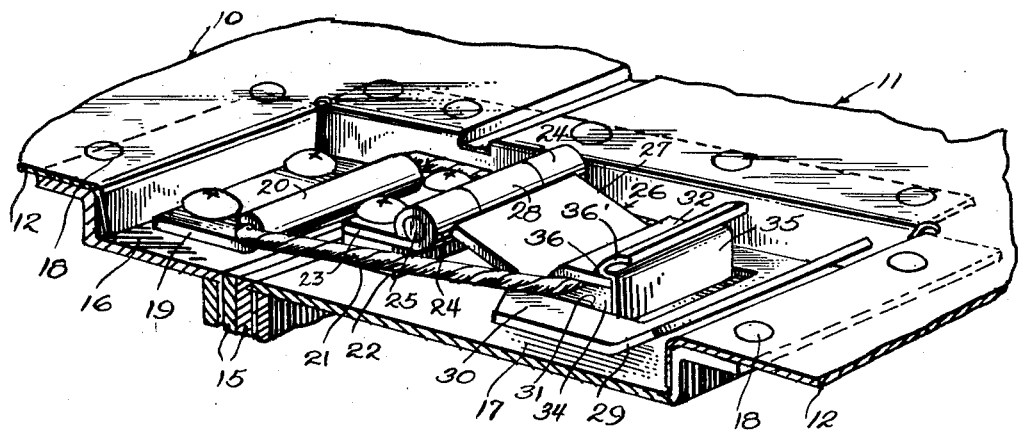
Figure 1 is a perspective view showing the parts in the locked position.

Referring specifically to the several figures of the drawing, wherein like reference characters have been used throughout the several views to designate like parts, 10 and 11 designate generally a pair of panels which are connected together in edge-to-edge relation by a plurality of fasteners according to the invention. For the sake of clarity, but a single fastener has been illustrated. However, it is to be understood that the abutting edges of the panels 10 and 11 are to be connected by as many spaced fasteners as necessary. Moreover, it is to be understood that the fasteners may be located on both surfaces of the panels as indicated in broken lines in Figure 4. The fasteners on the opposite surfaces may be staggered if desired.

Figure 4:
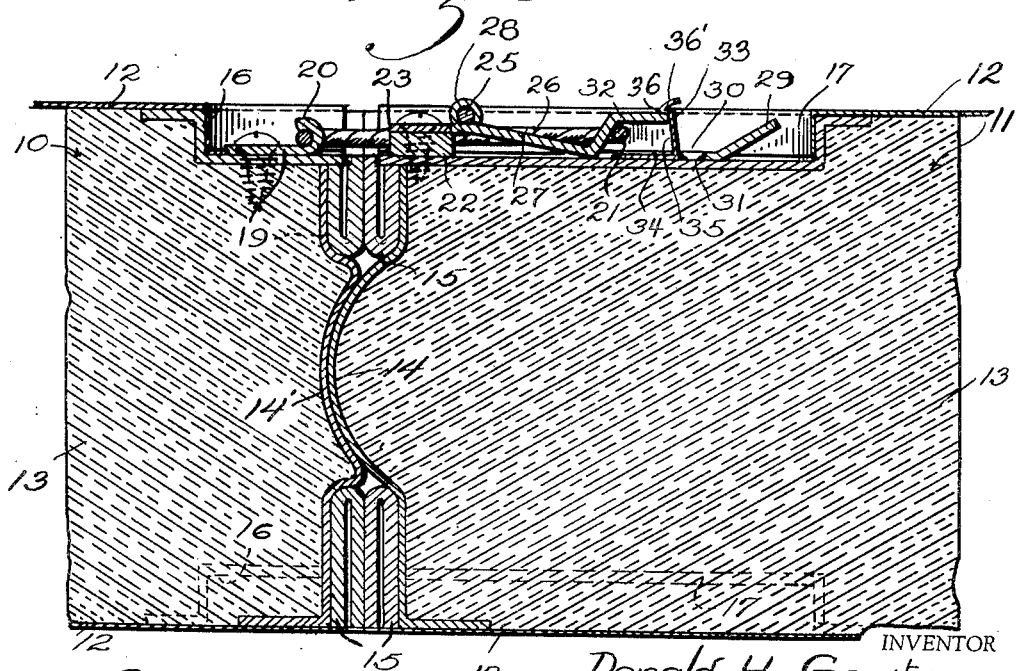
Figure 4 is a longitudinal, vertical, sectional view taken substantially on the plane of the line 4—4 of Figure 3.

The panels illustrated, and as best seen in Figure 4, are heat insulating panels and each comprise outer skins 12 of any suitable sheet material enclosing interior bodies 13 of insulating material. The abutting edges of the panels may be of tongue and groove configuration as shown at 14, 14' and are preferably sealed by any suitable resilient packing strips 15 which are compressed into hermetically sealed engagement by the action of the fastener. Obviously, where the fastener is used with insulating panels such as 10 and 11, and where the needs of the situation require that the fasteners be recessed, the insulating properties of the panel are reduced at the recessed points. Consequently, the shallower the recesses, the less is the reduction of the insulating properties at those points. The fasteners of the invention are extremely flat whereby they require but shallow recesses.

Such shallow recesses are formed in the flush surfaces of the panels 10 and 11 by recessed base plates 16 and 17 respectively. The base plates 16 and 17 are secured below the skins 12 in any suitable manner as by the fastening members 18 which may be rivets. Obviously, where my trunk latch type fasteners are used on more substantial or solid panels, the base plates 16 and 17 may be omitted.

The base plate 16 is comparatively small and has a plate 19 fixed to the floor thereof in any suitable manner. The forward edge of the plate 19 is upwardly curled to provide a bushing 20 for the pivot portion of the loop 21. If desired, the loop 21 may be formed of relatively rigid wire or the like but in the embodiment illustrated, the loop is formed from more flexible material such as metal cable.

The base plate 17 is comparatively large and mounts a hinge leaf 23 on the floor adjacent the edge of the panel 11. If desirable, the hinge leaf 23 may be raised above the floor of the base plate 17 and thereby above the plate 19 of the bushing 20 in any suitable manner as by the bed block 22. The inner edge of the hinge leaf 23 is upwardly curled to provide spaced bushings 24 for a hinge pin 25. By mounting the hinge leaf 23 on the block 22, a plane common to the axes of the bushings 20 and 24 is necessarily upwardly inclined. This arrangement inherently permits a shallower recess as it causes the body of the lever plate 26 to pass the dead center before it enters the recess 17 in its movement to the locked position.

Figure 2:
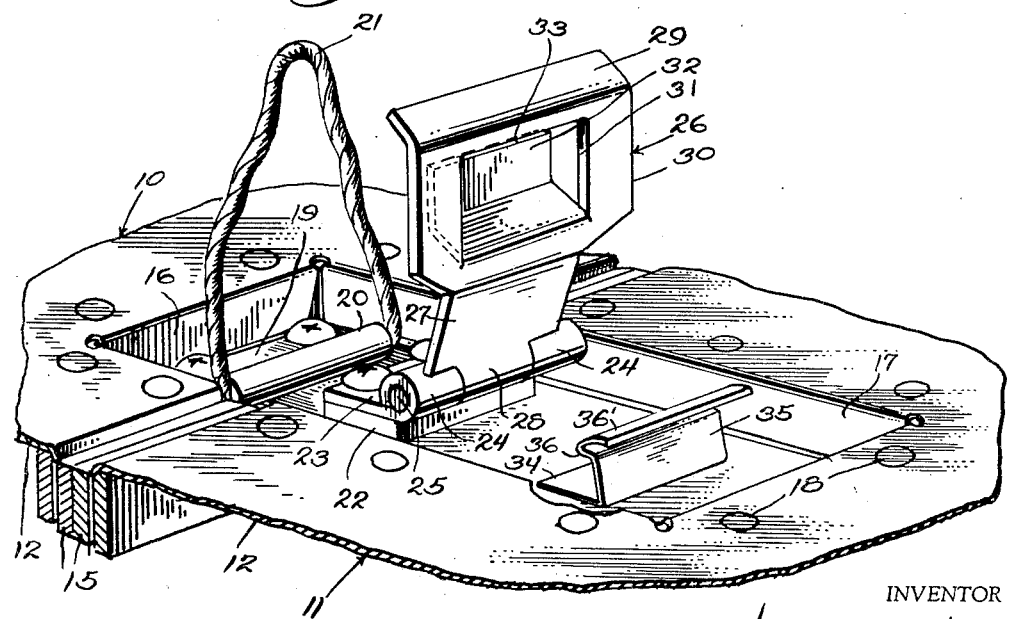
Figure 2 is a view like Figure 1 but showing the parts in the open position.
Figure 3:
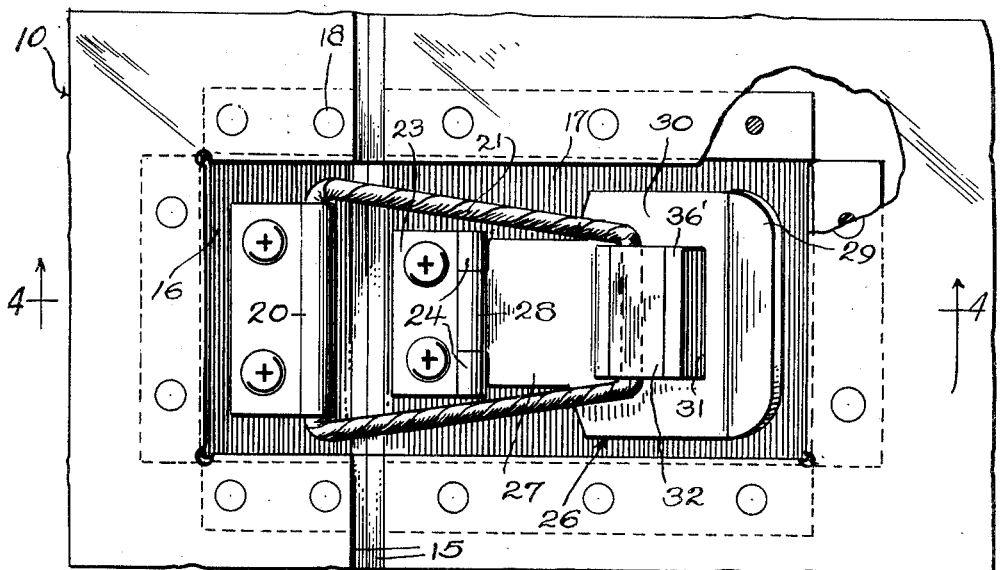
Figure 3 is a plan view with the parts in the locked position.

The lever plate 26 is of flattened channel form with one flange 27 thereof having a free upper edge formed to provide a bushing 28 whereby to pivotally mount the plate on the hinge pin 25 between the bushings 24 and in parallel relation to the pivot for the loop 21. The opposite flange 29 of the lever plate 26 provides a finger piece or grip for actuating the same. The web 30 of the lever plate 26 is formed with a centrally disposed opening 31 therethrough. The stock of the web 30 which forms the hole or opening 31 is unsevered at one edge and is upwardly struck or offset to form a normally open hook 32 for the loop 21. The hook 32 is formed with a free end edge 33 which is directed away from the pivotal axes of the loop 21 and lever plate 26 so that the loop tends to be retained in the hook 32 as the lever plate 26 is swung from the open position of Figure 2 to the locked position of the remaining views. As clearly seen in Figure 4, the part of the loop 21 which is engaged in the hook 32 is only slightly below dead center when the plate 26 is in the locked position. As the parts are under considerable strain, means now to be described have been provided to secure the lever plate 26 in the locked position while simultaneously reinforcing the hook against normal strains.

This means comprises a suitable latch which in the embodiment illustrated comprises an angle iron having one flange 34 fixed to the floor of the base plate 17 centrally thereof and the other flange 35 of which is upwardly directed so as to extend through the hole or opening 31 in the lever plate 26 when the latter is in the locked position. The upper free edge of the flange 35 is formed with a forwardly projecting bead 36 which engages over the free edge 33 of the hook 32 when the lever plate is in the locked position. Obviously, to permit this action, at least the flange 35 of the latch is formed of spring material whereby such flange and the bead 36 form a spring latch. Moreover, it should be noted that when the latch is engaged with the hook 32, it serves to close the hook against accidental dislodgement of the loop 21 while simultaneously locking the lever plate 26 in the locked position. Moreover, this arrangement also serves to prevent upward distortion of the hook 32 under the strain of the loop 21. This feature is of real value as it permits the lever plate to be made of relatively lightweight and less expensive sheet material without sacrificing any quality in the product. The latch is readily disengaged by pressing on the bead 36 in a direction away from the end edge 33 of the hook 32. However, the upper surface of the bead 36 is beveled or inclined as at 36' to provide a cam surface permitting automatic engagement of the latch as the lever plate reaches the locked position.

It is obvious that many modifications of the structure are possible within the spirit and scope of the invention. The essence of the invention is the engagement of the spring latch over the hook so as to prevent or at least retard distortion of the same under the strain of the loop 21. Clearly, this may be accomplished by other structures than that specifically disclosed.

Consequently, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a fastener for connecting together adjacent edges of two articles, the combination with a loop pivoted to one of said articles adjacent an edge thereof; of a base plate fixed to the other article adjacent an edge thereof, a lever plate pivoted to said base plate for pivotal movement relative thereto to and from a locked position atop said base plate and an open position in forwardly swung relation thereto, the pivotal axes of said lever plate and loop being parallel, a portion of said lever plate being forwardly struck therefrom to provide an opening therethrough and a forwardly extending loop-receiving hook, said hook having a free end directed away from the pivotal axes of said loop and lever plate so as to tend to retain said loop in said hook as said lever plate is swung from said open position to said locked position, a spring latch fixed to said base plate and extending forwardly thereof, and said latch being so located as to extend through said opening in said lever plate and resiliently engage said free end of said hook to releasably retain said lever plate in said locked position and simultaneously reinforce said hook against distortion under the strain of said loop therein.

2. In a fastener for connecting together adjacent edges of two articles, the combination with a loop pivoted to one of said articles adjacent an edge thereof; of a flat lever pivoted to the other article adjacent an edge thereof for pivotal movement relative thereto to and from a locked position atop said last named article and a forwardly swung open position, the pivotal axes of said loop and lever being substantially parallel, a portion of the stock of said lever being forwardly struck to provide an opening therethrough and a loop-receiving hook, said hook having a free end directed away from said axes of said lever and loop so as to tend to retain said loop in said hook as said lever is swung from said open to said locked position, a spring latch fixed to said last mentioned article and extending forwardly thereof, said latch extending through said opening in said lever when said lever is in said locked position, and said latch including a detent resiliently engaging said free end of said hook to releasably retain said lever in said locked position and simultaneously prevent distortion of said hook under the strain of said loop therein.

3. In a fastener for connecting together adjacent edges of two articles, the combination with a loop pivoted to one of said articles adjacent an edge thereof; of a flat lever pivoted to the other article adjacent an edge thereof for pivotal movement relative thereto to and from a locked position atop said last named article and a forwardly swung open position, the pivotal axes of said loop and lever being substantially parallel, said lever being formed with a forwardly extending loop-receiving hook, said hook having a free end directed away from said axes of said loop and lever so as to retain said loop in said hook as said lever is swung from said open to said locked position, a spring latch fixed to said second mentioned article and extending forwardly thereof, and said latch being resiliently engageable with said free end of said hook when said lever is in said locked position whereby to retain said lever in such position and simultaneously prevent distortion of said hook under the strain of said loop.

4. In a fastener for connecting together adjacent edges of two articles, the combination with a loop pivoted to one of said articles adjacent an edge thereof; of a lever pivoted to the other article adjacent an edge thereof for pivotal movement relative thereto to and from a locked position atop said last named article and a forwardly swung open position, the pivotal axes of said loop and lever being substantially parallel, a forwardly extending hook fixed to said lever, said hook having a free end directed away from said axes of said loop and lever so as to retain said loop in said hook as said lever is swung from said open to said locked position, a spring latch fixed to said second mentioned article and extending forwardly thereof, and said latch being resiliently engageable with said free end of said hook when said lever is in said locked position whereby to retain said lever in such position and simultaneously prevent distortion of said hook under the strain of said loop.

5. In a fastener for connecting together adjacent edges of two articles, the combination with a loop pivoted to one of said articles adjacent an edge thereof; of a lever pivoted to the other article adjacent an edge thereof for pivotal movement relative thereto to and from a locked position atop said last named article and a forwardly swung open position, the pivotal axes of said loop and lever being substantially parallel, a forwardly extending hook fixed to said lever, said hook having a free end directed away from said axes of said loop and lever so as to retain said loop in said hook as said lever is swung from said open to said locked position, a movable latch mounted on said second mentioned article, and said latch being movable into and out of locking engagement with said hook with said lever in said locked position, whereby to retain said lever in such position and simultaneously prevent distortion of said hook by said loop.

6. In a trunk-lock type of fastener of the kind wherein a loop pivoted to one article is engaged by a hook carried by a lever pivoted on another article so as to draw said articles together as said lever is swung from an open to a locked position with said loop engaged by said hook; the improvement comprising said lever being formed from sheet metal, said hook being a forwardly struck portion of the stock of said lever providing an opening through said lever, latch means carried by the second mentioned article, said latch means extending through said opening in said lever and engaging said hook when said lever is in said locked position to retain the same in such position, and said latch means also being operative simultaneously to close said hook and prevent distortion of the same.

DONALD H. GASTON.

References Cited in the file of this patent

UNITED STATES PATENTS

| Number | Name | Date |
| --- | --- | --- |
| 493,456 | Violet | Mar. 14, 1893 |
| 1,406,090 | Schermuly | Feb. 7, 1922 |
| 2,371,194 | Socke et al. | Mar. 13, 1945 |